United States Patent [19]
Vrionis

[11] Patent Number: 5,796,234
[45] Date of Patent: Aug. 18, 1998

[54] VARIABLE SPEED MOTOR APPARATUS AND METHOD FOR FORMING SAME FROM A SPLIT CAPACITOR MOTOR

[75] Inventor: Nick Vrionis, Los Altos, Calif.

[73] Assignee: Gas Research Institute, Chicago, Ill.

[21] Appl. No.: 784,143

[22] Filed: Jan. 17, 1997

Related U.S. Application Data

[63] Continuation-in-part of Ser. No. 733,532, Oct. 18, 1996, and Ser. No. 733,533, Oct. 18, 1996.

[60] Provisional application No. 60/010,274, Jan. 19, 1996.

[51] Int. Cl.$^6$ ................................................. H02P 1/44
[52] U.S. Cl. ...................... 318/751; 318/700; 318/701; 318/702

[58] Field of Search ............................. 318/700, 701, 318/702, 703, 704, 850, 720, 727, 726, 778, 779, 781, 784, 794

[56] References Cited

U.S. PATENT DOCUMENTS

| | | | |
|---|---|---|---|
| 5,512,809 | 4/1996 | Banks et al. | 318/788 |
| 5,561,357 | 10/1996 | Schroeder | 318/789 |

*Primary Examiner*—William M. Shoop, Jr.
*Assistant Examiner*—Kim Lockett
*Attorney, Agent, or Firm*—Dick and Harris

[57] ABSTRACT

The present invention is directed to the design of a low cost variable speed single phase AC induction motor by eliminating the capacitor, and running the motor as a two phase motor.

10 Claims, 4 Drawing Sheets

VARIABLE SPEED MOTOR APPARATUS AND METHOD FOR FORMING SAME FROM A SPLIT CAPACITOR MOTOR

This application claims the benefit of U.S. Provisional application Ser. No. 60/010,274, filed Jan. 19, 1996. This Application is also a continuation-in-part of U.S. application Ser. Nos. 08/733,532 and 08/733,533 filed Oct. 18, 1996, both of which also claim the benefit of U.S. Provisional application Ser. No. 60/010,274, filed Jan. 19, 1996.

BACKGROUND OF THE INVENTION

1. Technical Field

The present invention relates in general to electric motors and, in particular, to a variable speed two phase motor. This invention has particular application in HVAC systems.

2. Background Art

Various types of AC induction motors are well known in the art. One particular type of AC induction motor is the split phase motor. The split motor has four main parts: the rotor, the main (or running) winding, the auxiliary (or starting) winding and a centrifugal switch. The auxiliary (or starting) winding is in parallel with the main winding and in series with the centrifugal switch, such that once the rotor has reached 75–80% of its full speed, the switch is opened and the starting winding is effectively removed from the circuit. While providing a simple, inexpensive motor, the split phase motor produces only a small amount of starting torque.

The split capacitor motor—an improvement upon the split phase motor—is also well known in the art. Split capacitor motors provide better torque, are relatively less expensive and available in greater (mass) quantities than the split phase motor. Additionally, many HVAC systems currently in use include one or more split capacitor motors.

A split capacitor motor is formed by adding a capacitor to a split phase motor in the branch of the circuit containing the auxiliary (or starting) winding. This capacitor supplies a 90° phase shifted voltage to the auxiliary winding, thus providing additional starting torque for the rotor. There are three types of split capacitor motors: permanent split capacitor (PSC); capacitor start; and capacitor start/capacitor run. A capacitor start motor, an example of which is shown in FIG. 1, includes rotor 10, main winding 11, auxiliary winding 12, capacitor 13 and centrifugal switch 14. As with the split phase motor, centrifugal switch 14 opens once rotor 10 has reached 75–80% of full speed thereby removing auxiliary winding 12, capacitor 13 and centrifugal switch 14 from the circuit. As a result, the 90° phase shift provided by capacitor 13 and auxiliary winding 12 is used only when starting the motor to provide a higher starting torque.

FIG. 2 of the drawings is an example of a permanent split capacitor (PSC) motor. This motor differs from the capacitor start motor only in that centrifugal switch 14 is absent. As a result, auxiliary winding 12 and capacitor 13 remain in the circuit for both starting and running. Capacitor 13 in the permanent split capacitor motor has a value generally lower than the capacitor used in a capacitor start motor. Accordingly, the permanent split capacitor motor has a smaller starting but higher running torque than the capacitor start motor (such as that shown in FIG. 1).

FIG. 3 shows an example of a capacitor start/capacitor run motor. This type of capacitor motor differs from the permanent split capacitor and capacitor start motors in that it has two parallel capacitors 13 and 13b in "series" with auxiliary winding 12. Capacitor 13, which is the higher valued capacitor of the two parallel capacitors, is also in series with centrifugal switch 14, such that capacitor 13 drops out of the circuit after rotor 10 reaches 75–80% of full speed. Capacitor 13b remains in the circuit at all times along with auxiliary winding 12. In effect, the capacitor start/capacitor run motor combines the advantages of a capacitor start with a permanent split capacitor motor thus achieving both high starting and high running torque.

While these prior art capacitor motors are found in a majority of presently placed HVAC systems, it has been found that a variable speed motor would be more desirable in an HVAC environment to provide variable heating and cooling, as well as air circulation functions.

Variable speed motors, also well known in the art, have a significantly higher cost than the various types of split capacitor motors. Thus, it would be desirable to combine the cost savings of a split capacitor motor with a variable speed control. However, because variable speed control is usually achieved by varying the frequency of the voltage applied on the windings, at slow speeds the lower frequencies would cause the capacitor found in the split capacitor motors to present a higher impedance and the windings to present lower impedance resulting in significantly decreased efficiency.

Accordingly, it is an object of the present invention to provide a modified split capacitor type motor with variable speeds.

As many HVAC systems in the field already include a split capacitor type motor, it is an associated object of the present invention to provide a method for modifying existing motors in the field to convert those motors to variable speed motors.

These and other objects of the present invention will become apparent to those of ordinary skill in the art in light of the present specification, drawings and claims.

DISCLOSURE OF THE INVENTION

The present invention comprises a variable speed motor formed from a split capacitor motor with its capacitor replaced by means for driving the split capacitor motor. The driving means provides a first frequency signal to the first terminal and a second frequency signal to the third terminal wherein the first and second frequency signals are of at least two possible frequencies and 90 degrees out-of-phase relative to the second terminal. In this manner, the capacitor normally found in this type of motor is removed, thus, avoiding the previously discussed problems. In addition, in certain applications, the significant expense of the otherwise required capacitor is avoided.

In one preferred embodiment, the driving means includes three voltage drivers, three switching elements, and means for generating three sets of frequency signals. Each of the three voltage drivers are connected to a DC voltage supply and have an output. These outputs connect to the inputs of a respective one of the three switching elements, each of which are connected to the DC voltage supply as well and have an output connected to a respective one of the first, second and third terminals of the split capacitor motor. The frequency signals generating means, generates three sets of signals, each controlling a respective one of the three voltage drivers and its respective one of the three switching elements.

The invention further comprises a method for forming a capacitor-less motor from a split capacitor type motor by: removing the capacitor; connecting a controller to the first, second and third terminals of the motor; and driving the motor via the controller at one predetermined speed.

The invention additionally comprises a method for forming a variable speed motor from a split capacitor type motor by: removing the capacitor; connecting a controller to the first, second and third terminals; and driving the motor via the controller at one of two or more predetermined speeds. The step of driving the motor via the controller comprises the sub-steps of: providing a first signal to the first terminal of the motor having a first frequency; providing a second signal to the second terminal of the motor having a second frequency; providing a third signal to the third terminal of the motor having a third frequency; and supplying the first, second and third signals such that the first and second signals are 90 degrees out-of-phase with respect to each other relative to the third signal and the first and second frequencies are the same one of two or more predetermined frequencies that correspond to the two or more predetermined speeds. In a preferred embodiment, the step of supplying the first, second and third signals involves either generating the first, second and third signals when the predetermined speed is less than a predetermined value or connecting the first, second and third signals to AC mains.

In a preferred embodiment, the two or more predetermined speeds are continuous over a range of speeds.

In one embodiment, the method of converting the motor may further include the step of rewinding the auxiliary winding to optimize it for use with the controller and primary winding.

BEST MODE FOR CARRYING OUT THE INVENTION

Figure 1:
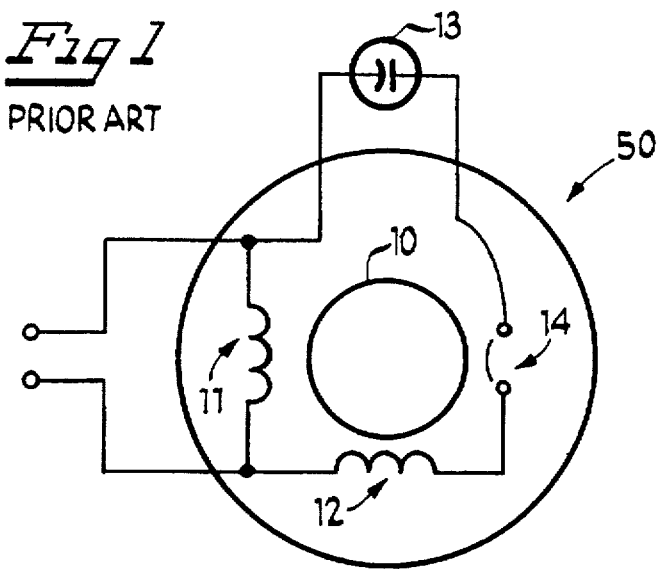
FIG. 1 of the drawings is a schematic block diagram of a prior art capacitor start motor.
Figure 2:
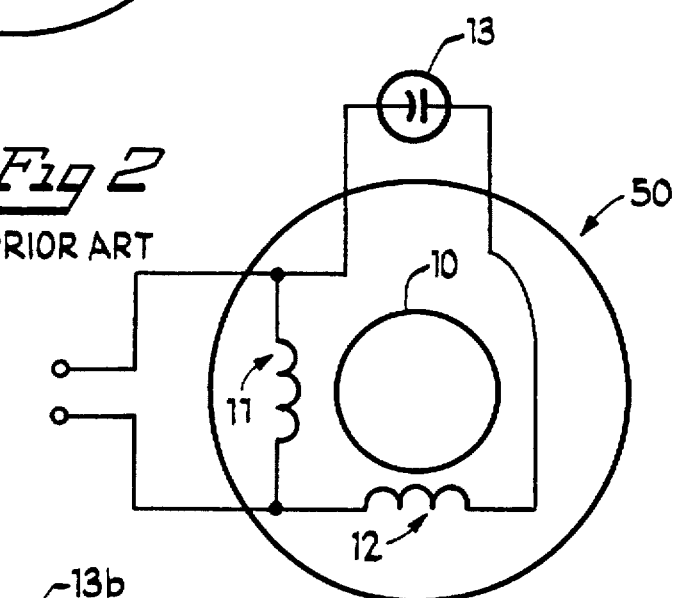
FIG. 2 of the drawings is a schematic block diagram of a prior art permanent split capacitor motor.
Figure 3:
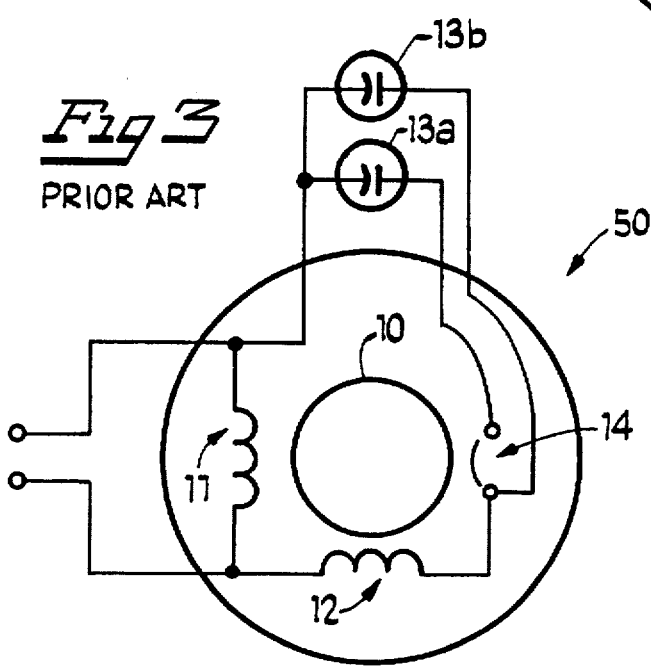
FIG. 3 of the drawings is a schematic block diagram of a prior art capacitor start/capacitor run motor.

While this invention is susceptible of embodiment in many different forms, there is shown in the drawings and will herein be described in detail, a plurality of embodiments with the understanding that the present disclosure is to be considered as an exemplification of the principles of the invention and is not intended to limit the invention to any of the embodiments disclosed herein.

The present invention involves removing capacitors 13 (and 13b from capacitor start/capacitor run motors) from capacitor motors 50 and using a controller 100 to run both windings of the motor, resulting in a two phase driven motor. (See FIGS. 1–4).

Figure 4:
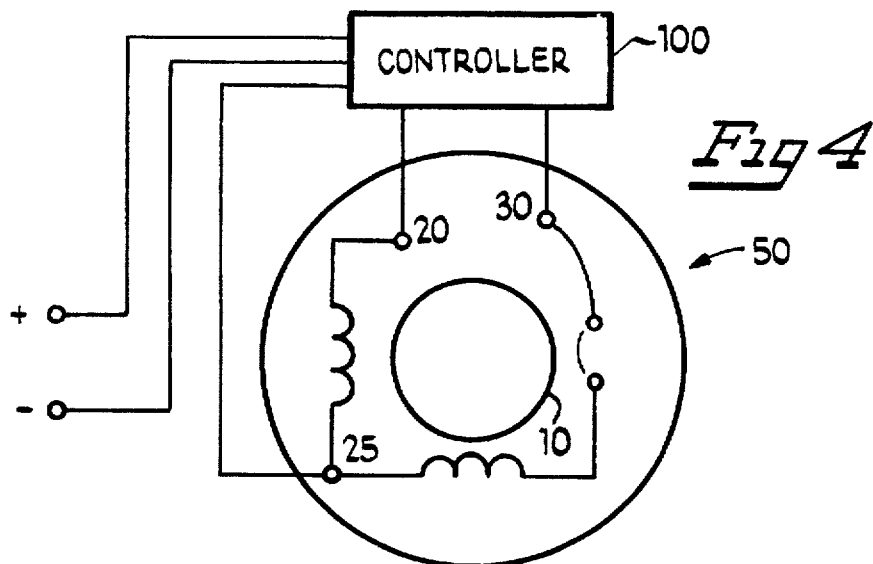
FIG. 4 of the drawings is a schematic block diagram of one embodiment of the presently disclosed variable speed AC induction motor with controller attached thereto.
Figure 5:
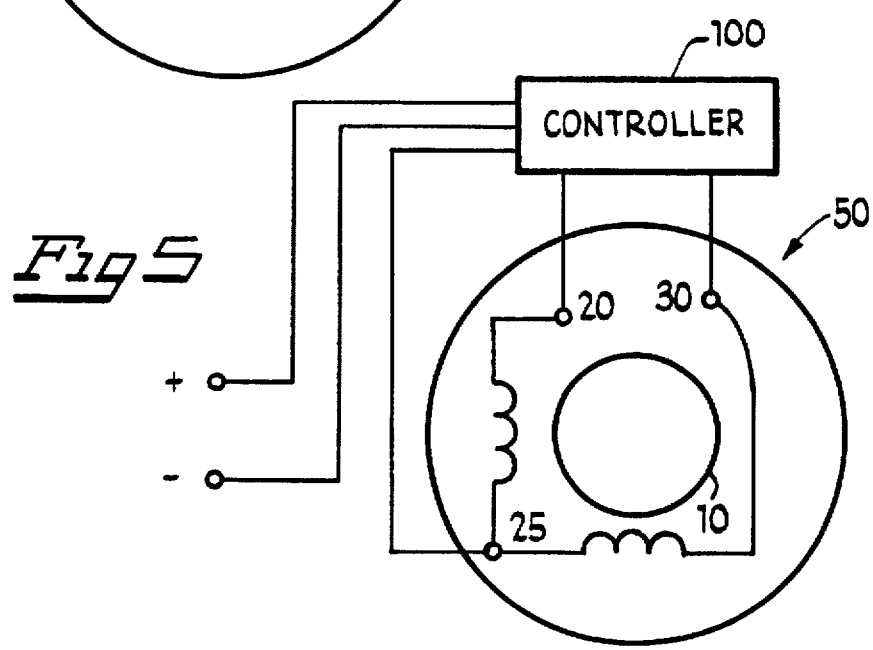
FIG. 5 of the drawings is a schematic block diagram of another embodiment of the presently disclosed variable speed AC induction motor with controller attached thereto.
Figure 6:
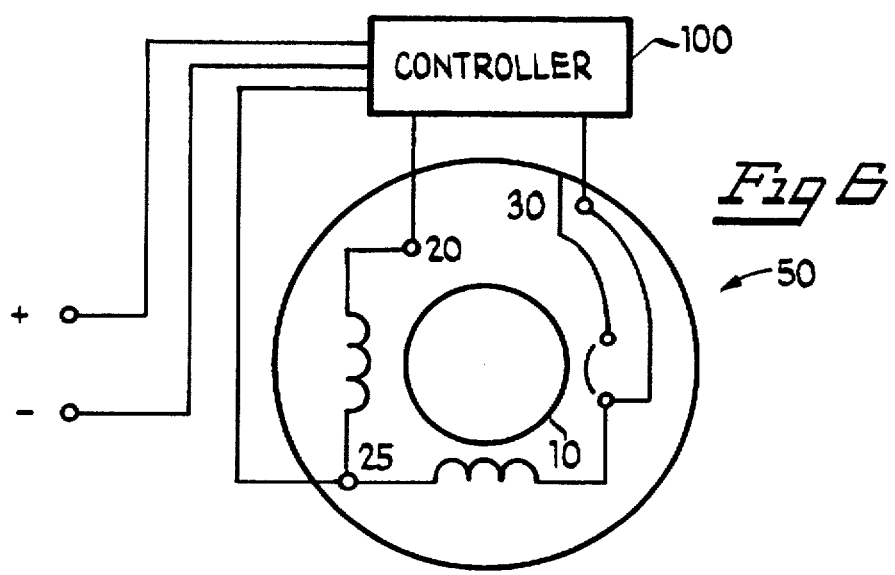
FIG. 6 of the drawings is a schematic block diagram of another embodiment of the presently disclosed variable speed AC induction motor with controller attached thereto.

Controller 100 generates and provides the variable frequency voltages to primary winding 11 required for a variable speed motor, as well as the 90° phase shifted version of the selected variable frequency voltage to secondary winding 12. As shown in FIGS. 4, 5 and 6, controller 100 is connected to mains power supply and the three terminals of motor 50. In this configuration, controller 100 provides V voltage to terminal 20, V+90° to terminal 30, and the two windings 11 and 12 are tied together at terminal 25.

If desired, the design of this motor may be optimized to handle the 0° and 90° phase shifted variable frequency drive voltages generated, by rewinding auxiliary winding 12 such that it is no longer optimized for the capacitor, but instead to provide maximum performance working in unison with primary winding 11. This approach allows the use of the low cost and volume associated with the split capacitor motor with only a small change in the winding configuration. Of course, it is also contemplated that there will be cases where rewinding for optimization will be unnecessary or undesirable, such as an in the field retrofit of an installed split capacitor motor.

Figure 7:
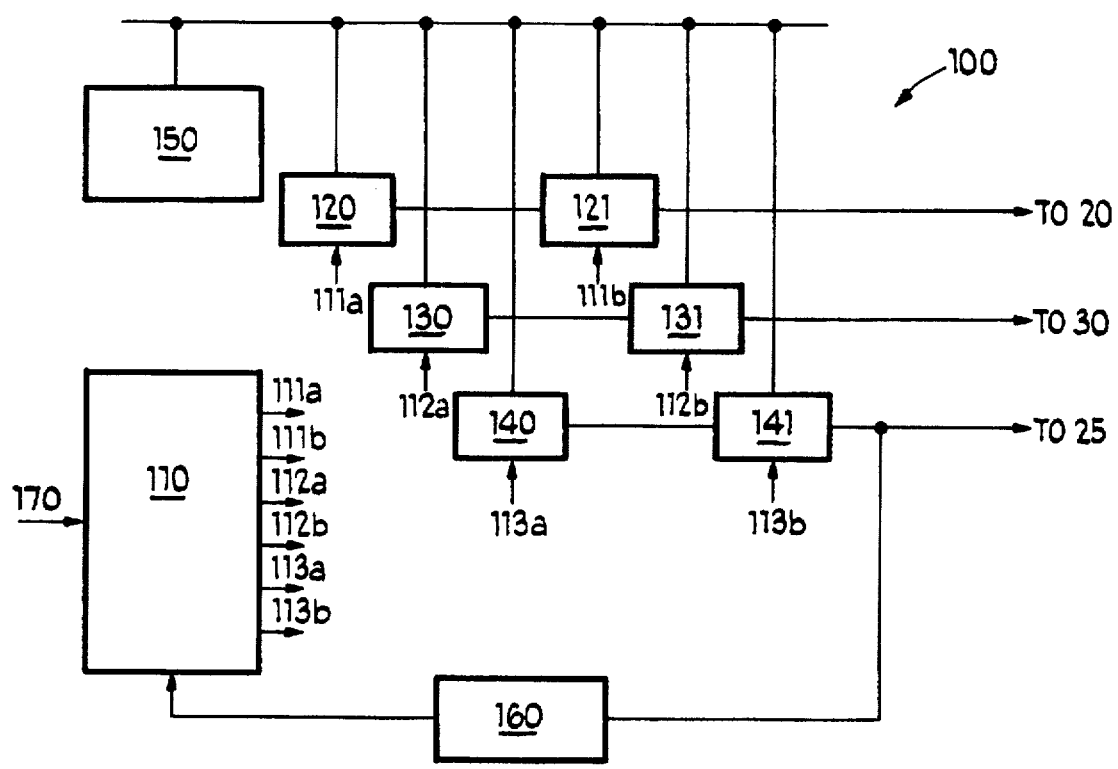
FIG. 7 of the drawings is a schematic block diagram of one embodiment of the controller for use in the present invention.

As shown in FIG. 7, one embodiment of controller 100 includes—among other components—frequency generator 110 for generating various frequency sine waves 111a, 111b, 112a, 112b, 113a and 113b. Frequency generator 110 generates a set of constant frequency signals selected from one of the multiple sets of frequencies that can be generated thereby.

For each set of signals 111, 112 and 113 output by frequency generator 110, the components (i.e. 111a and 111b) are 180° out of phase from each other. Set 113 controls the common for the motor, terminal 25. Sets 111 and 112 are defined from this common point; 111 to 113 is 90° out of phase from 112 to 113. The a-signal (111a, 112a and 113a) for each set of signals 111, 112 and 113 control their respective drivers 120, 130 and 140. The b-signal (111b, 112b and 113b) for each set of signals 111, 112 and 113 control their respective switches 121, 131 and 141.

While constant frequency signals are desired, it is contemplated that a slight amount of frequency modulation may occur in one or more of these signals at any time. These constant frequency signals merely need to be modulated signals such as a pulse width modulated signal or standard sine wave signal. The constant frequency signals are usually in the range of 1–120 kHz, while the pulse width modulations can occur at—but are not limited to—approximately 25 kHz. In any event, the frequency of these constant frequency signals is based upon the desired output of the motor.

Controller 100 generates a particular frequency sine wave based upon the value of control signal 170. Control signal 170 may be an analog voltage, digital signal, pulse width modulated signal or other signal for conveying the control value based on information from any number of apparatuses such as thermostats and operator control panels. Additional control circuitry, as would be readily understood to one with ordinary skill in the art, may be necessary to convert control signal 170 into a readable signal for frequency generator 110.

Controller 100 may also include step-down transformer/voltage regulator 150 to provide the correct DC voltages to frequency generator 110 and the other controller circuitry and current sense 160, which provides feedback to frequency generator 110 indicating current through the motor, which may be used by frequency generator 110 or control circuitry to modify generated constant frequency signals 111, 112 and 113, which may comprise sine waves.

Drivers 120, 130 and 140 provide the voltage required for the motor as controlled by frequency generator 110. Drivers 120, 130 and 140 include (among other possible components) switches that ultimately connect regulated power (provided by voltage regulator 150) to motor 50, via switches 121, 131 and 141, with the output of each of drivers 120, 130 and 140 being electrically connected to switches 121, 131 and 141, respectively. In one embodiment, drivers 120, 130 and 140 may each comprise high side drivers, however, any circuit which provides the required voltage level shifting to provide sufficient power to the motor is within the scope of the present invention.

Switches 121, 131 and 141 provide the current required for the motor as controlled by frequency generator 110. Each switch 121, 131 and 141 may comprise one or more power FETs or IGBTs, each of which draw current from the DC rail powered by voltage regulator 150. The output of switches 121, 131 and 141 are electrically connected to terminals 20, 30 and 25, respectively.

Figure 8:
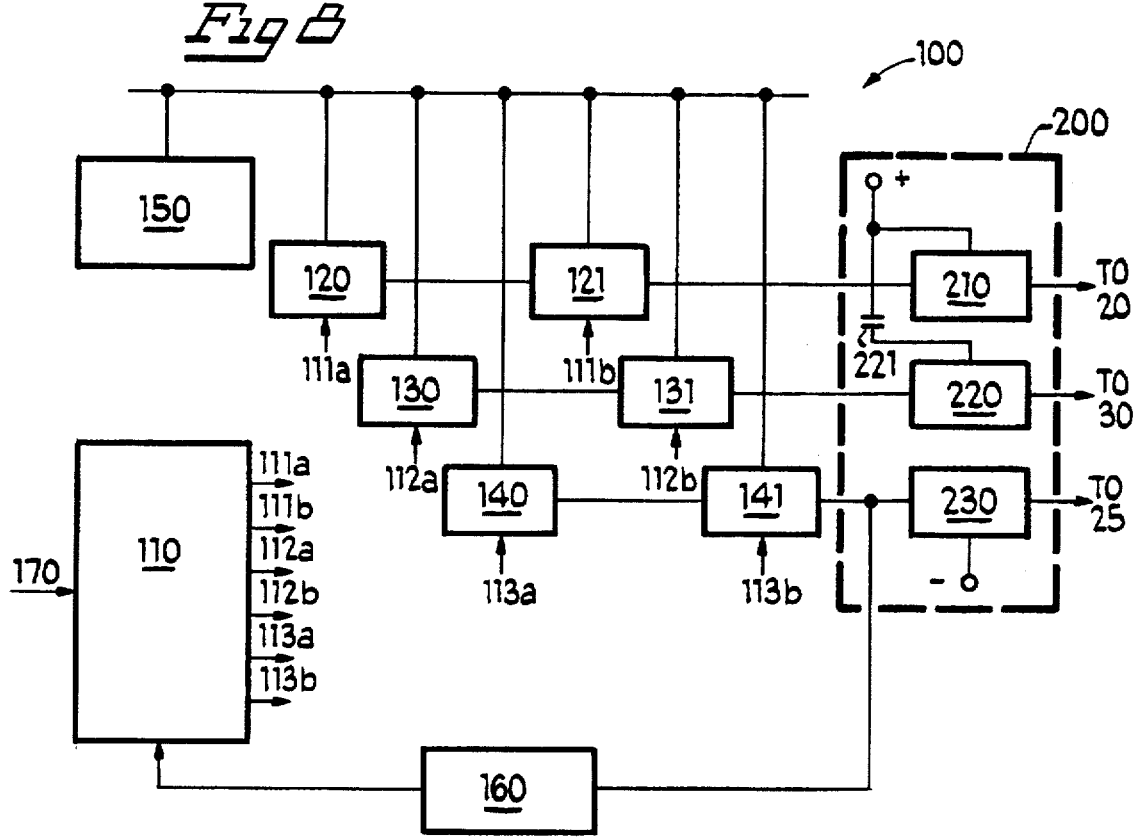
FIG. 8 of the drawings is a schematic block diagram of another embodiment of the controller for use in the present invention.

In its basic form, controller 100 utilizes frequency generator 110 and switches 120, 130 and 140 to control the speed of motor 10 over its full range (i.e. 0-100% of full speed). In most applications, including HVAC systems, this complete operating range is unnecessary. Thus, controller 100 can be modified to provide frequencies only over a more limited range, for instance 20-60% of full speed. This range, of course can be selected for the specific application in which motor 50 will be utilized. Once a speed beyond the maximum speed provided by frequency generator 110 is desired, power bypass 200 would activate, in turn providing 100% of full speed through a direct connection with main power (see FIG. 8). As shown, power bypass 200 may comprise relays or solid state switches 210, 220 and 230 and capacitor 221. Once control signal 170 surpasses the maximum speed programmed for frequency generator 110, relays 210, 220 and 230 would be programmed to shift from the output of switches 121, 131 and 141 to the direct connection AC power. Capacitor 221 is optional and would be located in the branch providing power to the secondary winding, where desired. Capacitor 221 can be matched to provide the appropriate 90° phase shifted sine wave at 100% of full speed. Alternatively, power bypass 200 can be designed without capacitor 221 by merely leaving open that terminal of relay 220, because by definition, the motor would not require additional starting torque. At 100% of full speed, the affect on the efficiency of motor 50 due to this loss of the 90° shifted sine wave in the secondary winding is likely to be minimal.

While overall there may be some performance sacrifice with use of this modified controller, real world applications should not be significantly affected. Most applications would not desire speed between 1-19%. As for the 61-99% range, most applications will not require speeds in that range for which 100% of full speed would not be more than adequate. More importantly, a cost savings would be realized because the reduced range allows a reduction in the size of the output switches. A large portion of the costs of controller 100 is from the output switch semiconductor cost. Typically, these switches need to be larger to endure the large inrush current and power output required in many applications. A typical motor has large inrush currents requiring two to six times their running current requirement. With this controller, the motor can be started slowly for many applications, such as running fans, resulting in controlled input currents and less noise. Once the motor is turning sufficiently fast, it can be switched to full speed by the relays 210, 220 and 230. Accordingly, the inrush current required can be minimized. As for the power requirement, the power output required when turning a fan from switches 121, 131 and 141 can be lowered by approximately 80% by designing power bypass 200 to cut out at 60% of full speed.

Figure 9:
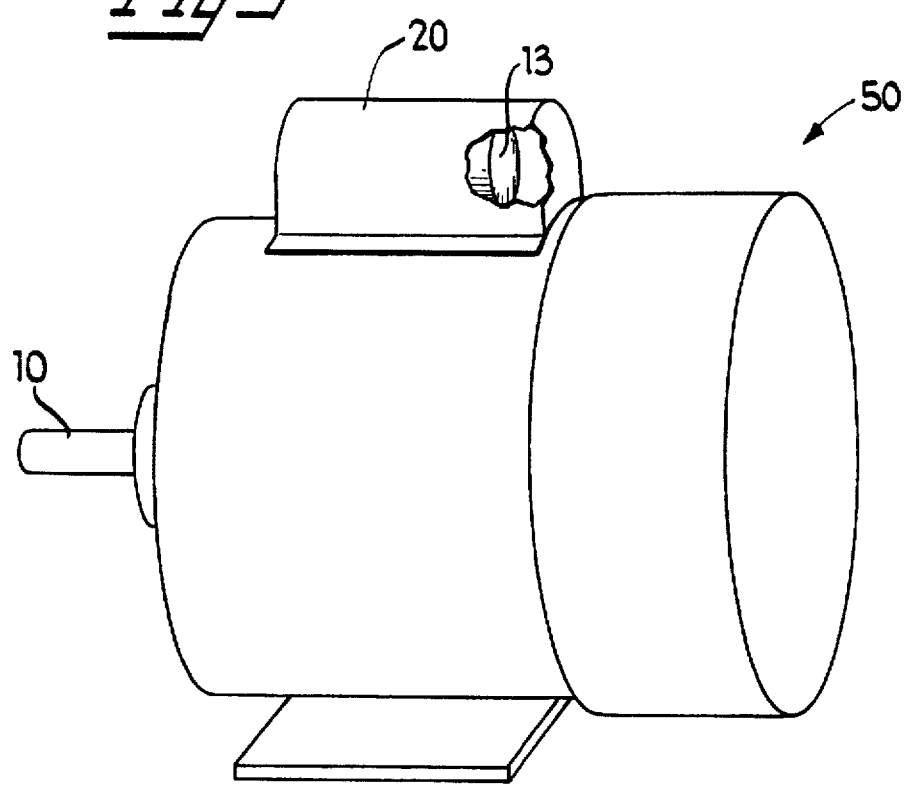
FIG. 9 of the drawings is a cut-away perspective view of a commercially available permanent split capacitor motor.

The simplicity of the scheme disclosed will allow servicemen to modify existing motors already placed in operation. FIG. 9 shows a cut-away photograph of a commercially available permanent split capacitor motor. In this motor, capacitor 13 is disposed on the top of the main housing in separate housing 20. By removing housing 20 and, in turn, capacitor 13, the serviceman can then connect the freed terminals to controller 100. The serviceman then reconnects the original mains power connections to controller 100 resulting in a variable speed motor. In the capacitor start/capacitor run motors, both capacitors 13 and 13b are removed with the controller being connected to the run capacitor terminals. The terminals for the start capacitor are grounded. In this manner, any type of capacitor motor may be modified.

Figure 10:
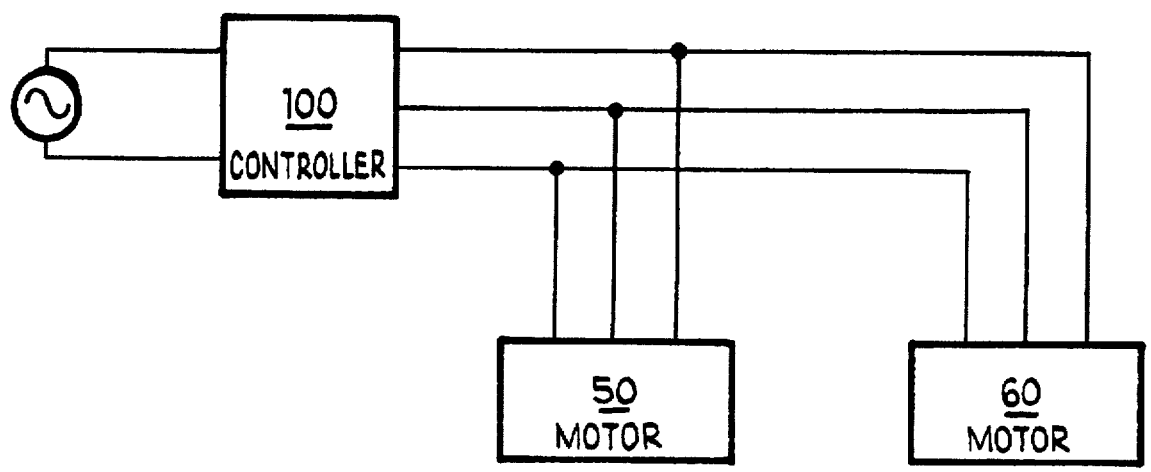
FIG. 10 of the drawings is a block diagram of a multiple motor, single controller embodiment of the present invention.

A further advantage of this motor design is depicted in FIG. 10. As shown, controller 100, unlike the simple capacitor design can be used to control multiple motors 50 and 60, in parallel. This is desirable, for instance, in HVAC systems, which include both a blower and an induced draft motor in the system. Motors 50 and 60 are both driven by the same power source and the same controller 100, significantly reducing the cost of the systems. Of course, in this manner, some form of controller 100 could be used in controlling multiple DC motors, instead.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

What is claimed is:

1. A variable speed motor comprising:
    a split capacitor motor having a first terminal, a second terminal and a third terminal, a primary winding between the first and second terminals, an auxiliary winding between the second and third terminals, the split capacitor motor having its capacitor removed from between the first and third terminals; and
    means for driving the split capacitor motor in place of the capacitor across the first and third terminals as well as through the second terminal, the driving means providing a first frequency signal to the first terminal and a second frequency signal to the third terminal wherein the first and second frequency signals are both one of at least two possible frequencies and 90 degrees out-of-phase relative to the second terminal.

2. The invention according to claim 1 wherein the driving means comprises:
    three voltage drivers, each of the three voltage drivers being connected to a DC voltage supply and having an output;
    three switching elements, each of the three switching elements being connected to the DC voltage supply and a respective one of the three voltage driver outputs and having an output, each of the three respective outputs being connected to a respective one of the first, second and third terminals of the split capacitor motor; and means for generating three sets of frequency signals, each of the three sets of frequency signals controlling a respective one of the three voltage drivers and its respective one of the three switching elements.

3. A method for forming a capacitor-less motor from a motor of the type having a rotor, a first terminal, a second terminal and a third terminal, a primary winding between the first and second terminals, an auxiliary winding between the second and third terminals, and a capacitor between the first and third terminals, the method comprising:

removing the capacitor; and connecting a controller to the first, second and third terminals, the controller being constructed to drive the motor rotor by applying first and second frequency signals 90 degrees out-of-phase relative to one another to run the rotor at one predetermined speed.

4. A method for forming a variable speed motor from a motor of the type having a rotor, a first terminal, a second terminal and a third terminal, a primary winding between the first and second terminals, an auxiliary winding between the second and third terminals, and a capacitor between the first and third terminals, the method comprising:

removing the capacitor; and connecting a controller to the first, second and third terminals, the controller being constructed to drive the motor rotor by applying first and second frequency signals 90 degrees out-of-phase relative to one another to run the rotor at one speed selected from two or more predetermined speeds over a complete range of speeds.

5. The invention according to claim 4 wherein the two or more predetermined speeds are continuous over a range of speeds.

6. The invention according to claim 5 wherein the step of driving the motor via the controller comprises:

providing a first signal to the first terminal of the motor having a first frequency;

providing a second signal to the second terminal of the motor having a second frequency;

providing a third signal to the third terminal of the motor having a third frequency; and supplying the first, second and third signals such that the first and second signals are 90 degrees out-of-phase with respect to each other relative to the third signal and the first and second frequencies are the same one of two or more predetermined frequencies that correspond to the two or more predetermined speeds.

7. The invention according to claim 6 wherein the step of supplying the first, second and third signals comprises:

generating the first, second and third signals when the predetermined speed is less than a predetermined value; and connecting the first, second and third signals to AC mains above the predetermined value.

8. The invention according to claim 4 further comprising the step of rewinding the auxiliary winding to optimize it for use with the controller and primary winding.

9. The invention according to claim 3 further comprising the step of rewinding the auxiliary winding to optimize it for use with the controller and primary winding.

10. A method for running a motor at variable speeds, the method comprising:

obtaining a motor of the type having a rotor, a first terminal, a second terminal and a third terminal, a primary winding between the first and second terminals, an auxiliary winding between the second and third terminals, and a capacitor between the first and third terminals;

removing the capacitor;

connecting a controller to the first, second and third terminals; and driving the rotor via the controller at one speed from two or more predetermined speeds over a complete range of speeds.

* * * * *